United States Patent [19]

Martin

[11] 4,078,104

[45] * Mar. 7, 1978

[54] RELEASE COMPOSITION FOR BITUMINOUS MATERIALS

[75] Inventor: Eugene Ray Martin, Onsted, Mich.

[73] Assignee: SWS Silicones Corporation, Adrian, Mich.

[*] Notice: The portion of the term of this patent subsequent to May 13, 1992, has been disclaimed.

[21] Appl. No.: 554,299

[22] Filed: Feb. 28, 1975

[51] Int. Cl.$^2$ ................................................ B05D 3/02
[52] U.S. Cl. .................................... 427/387; 427/154; 427/156; 427/388 R; 427/390 R; 427/391; 427/409; 427/411

[58] Field of Search .............. 427/133, 135, 154, 156, 427/409, 388, 387, 391, 390 R; 264/213, 338

[56] References Cited

U.S. PATENT DOCUMENTS

| | | | |
|---|---|---|---|
| 1,979,012 | 10/1934 | Reilly | 264/338 |
| 2,047,385 | 7/1936 | Sanders | 264/338 |
| 3,492,394 | 1/1970 | Heine | 264/213 |
| 3,819,793 | 6/1974 | Elliott | 264/213 |
| 3,883,628 | 5/1975 | Martin | 264/338 |

*Primary Examiner*—Ronald H. Smith
*Assistant Examiner*—Janyce A. Bell

[57] ABSTRACT

A release composition for bituminous materials comprising a mixture of an organopolysiloxane and an aminofunctional silicon fluid.

17 Claims, No Drawings

RELEASE COMPOSITION FOR BITUMINOUS MATERIALS

This invention relates to a release composition for bituminous materials and more particularly to a method for imparting release properties between a substrate and bituminous materials.

Heretofore, various compositions such as petroleum oils and organopolysiloxane fluids have been used in an effort to obtain release between bituminous materials and their confining or shipping means. Generally, these release agents are applied to the surfaces of the confining means prior to the introduction of the bituminous materials or they have been incorporated into the bituminous materials. While these agents have improved the release characteristics between the bituminous compositions and their confining means, there are certain disadvantages. For example, frequent applications of these release agents are required in order to obtain satisfactory release between the confining means and the bituminous materials.

In addition, some release agents such as petroleum oils adversely effect the physical properties of bituminous materials, especially where these materials are used in the construction of pavements. For example, when bituminous compositions are used in pavement construction, release agents such as petroleum oils have a tendency to migrate to the surface and cause soft spots in the pavements.

Therefore, it is an object of this invention to provide a release composition for bituminous materials. Another object of this invention is to provide a release composition having improved release characteristics when employed with bituminous materials. Still another object of this invention is to provide a release composition which may be used in combination with bituminous materials without adversely affecting the physical properties of the bituminous composition. A further object of this invention is to provide a method for imparting release properties to a substrate which is in contact with the bituminous materials.

The foregoing objects and others which will become apparent from the following description are accomplished in accordance with this invention, generally speaking, by applying a composition comprising an organopolysiloxane fluid and an aminofunctional silicon fluid to a confining means or shipping means prior to contacting the substrate with the bituminous materials.

Organopolysiloxane fluids which are used in this invention may be represented by the general unit formula

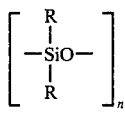

wherein the R(s), which may be the same or different, represent monovalent hydrocarbon radicals having from 1 to 18 carbon atoms and $n$ is a number greater than 20.

Radicals represented by R above are alkyl radicals, e.g., methyl, ethyl, propyl, butyl, octyl, dodecyl and octadecyl; arylradicals, e.g., phenyl, diphenyl and naphthyl radicals; alkenyl radicals, e.g., vinyl and allyl radicals; cycloalkyl radicals, e.g., cyclobutyl, cyclopentyl and cyclohexyl; alkaryl radicals, e.g., tolyl, xylyl, ethylphenyl; aralkyl radicals, e.g., benzyl, alphaphenylethyl, beta-phenylethyl and alpha-phenylbutyl and the like.

The organopolysiloxane fluids may be either linear or branched chained siloxanes having an average of from 1.75 to 2.25 organic radicals per silicon atom. Generally, it is preferred that the organopolysiloxane be free of terminal-hydroxyl groups; however, a small number of terminal-hydroxyl groups will not materially affect the release properties of the composition. The organopolysiloxane may have a minor amount of molecules having only one hydroxyl group, or there may be a small number of molecules carrying an excess of two hydroxyl groups; however, as mentioned previously it is preferred that the organopolysiloxane be substantially free of hydroxyl groups. In general, the polysiloxane fluids should have a viscosity of between about 5 cs. and 1,000,000 cs., and more preferably, between about 50 cs. and 300,000 cs. at 25° C. In addition, it is possible to combine high and low viscosity fluids to form a fluid having the desired viscosity range.

The aminofunctional silicon fluids employed in this composition may be prepared by mixing an organopolysiloxane with aminofunctional silanes, or siloxanes and thereafter equilibrating the mixture in the presence of an equilibration catalyst. Organopolysiloxanes which may be used in the preparation of these aminofunctional silicon fluids are cyclic siloxanes of the general formula

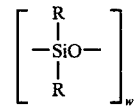

or linear or branched organopolysiloxanes having the general formula $$R_y SiR_z O_{4-y-z/2}$$

in which R is the same as R above, $y$ is a number of from about 0.5 to 3.0, $z$ is a number of from 0.001 to 1 and the sum of $y$ and $z$ is a number of from 1 to 3.0 and $w$ is a number of from 3 to 10.

Examples of suitable cyclic organopolysiloxanes which may be used in the formation of these aminofunctional silicon fluids are hexamethylcyclotrisiloxane, hexaphenylcyclotrisiloxane, 1,2,3-trimethyl-1,2,3-triphenylcyclotrisiloxane, 1,2,3-trimethyl-1,2,3-trivinylcyclotrisiloxane, octamethylcyclotetrasiloxane, 1,2,3,4-tetramethyl-1,2,3,4-tetravinylcyclotetrasiloxane and the like. Cyclic siloxanes in which $w$ has a value of from 3 to 4 are preferred.

Examples of linear or branched chained siloxanes which may be used are triorganosiloxy end-blocked organopolysiloxanes such as trimethylsiloxy end-blocked dimethylpolysiloxanes, diethylpolysiloxanes, methylphenylpolysiloxanes, diphenylpolysiloxanes and copolymers thereof.

The aminofunctional silanes or siloxanes which are reacted with the organopolysiloxanes may be represented by the general formula

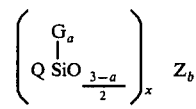

in which G represents the radicals R, OR', OR" NR'$_2$, or OSiR$_3$ in which R is the same as R above, R' represents hydrogen or monovalent hydrocarbon radicals having from 1 to 18 carbon atoms, R" is a substituted or unsubstituted divalent hydrocarbon radical having from 1 to 18 carbon atoms, a substituted or unsubstituted divalent hydrocarbonoxy radical in which the oxygen is in the form of an ether linkage or an unsaturated divalent hydrocarbon radical, Q represents the radicals

R'$_2$NR"—,

R'$_2$NR"NR'—and
$\quad\quad\quad$|
$\quad\quad\quad$R'

R$_2$NR"OR"—,

Z is a radical selected from the group consisting of R'O$_{0.5}$, R$_3$SiO$_{0.5}$ and R'$_2$NR"O$_{0.5}$, in which R, R' and R" are the same as above, $a$ is a number of from 0 to 2, $b$ is a number of from 0 to 3 and $x$ is a number of from 1 to 20,000.

Examples of suitable divalent radicals represented by R" are hydrocarbon radicals having from 2 to 18 carbon atoms such as ethylene, trimethylene, tetramethylene, hexamethylene, octamethylene; hydrocarbonoxy radicals having the formula (—OC$_2$H$_4$—)$_r$, (—OC$_2$H$_4$OCH$_2$—)$_r$, and
(—OC$_3$H$_6$—)$_r$, in which $r$ is a number of from 1 to 50 such as ethylene oxide, trimethylene oxide and polymers thereof and alkylene radicals such as vinylene, propenylene, butenylene, hexenylene and the like.

Examples of suitable aminofunctional silanes are beta-aminopropyltriethoxysilane, gamma-aminopropyltrimethoxysilane, methyl-beta-(aminoethyl) gamma-aminopropyldimethoxysilane, omega-aminohexyltributoxysilane, beta-(aminoethoxy) propyltrimethoxysilane, beta-(aminoethoxy) hexyltriethyoxysilane, beta-(aminopropoxy) butyltributoxysilane, methyl-beta-(aminopropoxy)propyldi-(aminoethoxy silane,

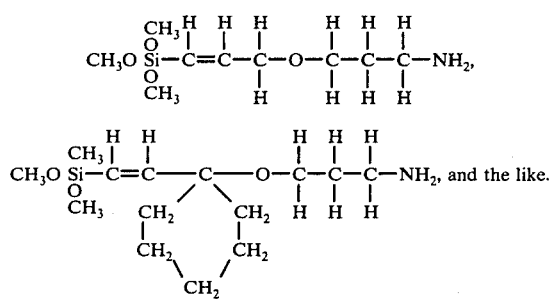

Representative examples of aminofunctional siloxanes are

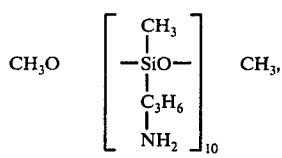

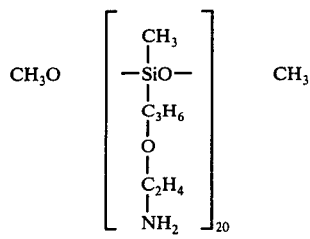

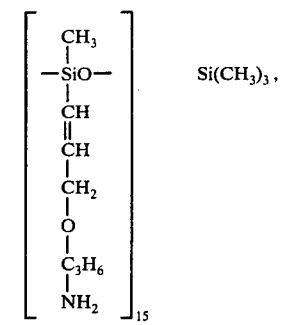

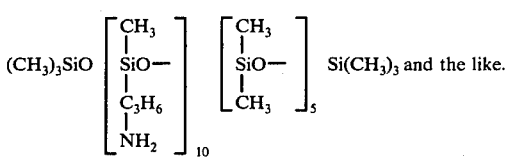

The aminofunctional silicon fluids are prepared by equilibrating a mixture containing an aminofunctional silane or siloxane and an organopolysiloxane in the presence of a base catalyst.

Catalysts which may be employed in the equilibration reaction are bases such as hydroxides, e.g., sodium hydroxide, potassium hydroxide, cerium hydroxide, tetramethylammonium hydroxide and the like; alkali metal alkoxides, e.g., sodium butoxide and the like; alkali metal hydrides, e.g., sodium hydride and the like; silanolates, e.g., potassium silanolate, tetramethylammonium silanolate and the like; alkali metal alkyls, e.g., ethylsodium; alkali metal alkenyls; alkali metal aryls, e.g., biphenyl sodium, potassium naphthalene and the like.

Although the amount of catalyst is not critical, it is preferred that from 0.001 percent up to about 10 percent by weight of catalyst based on the weight of the aminofunctional silane or siloxane be employed to effect equilibration.

Generally, it is desirable to remove or destroy the catalysts after equilibration because their presence will adversely affect the properties of the resulting polymer. The catalysts may be removed, for example, by washing with water or they may be destroyed by neutralizing with acidic reagents. In addition, certain catalysts may be destroyed by heating the reaction mixture to an elevated temperature after the equilibration reaction is completed.

The equilibration reactions may be conducted at any temperature ranging from about 25° C. up to about 200° C. over a period of time ranging from 0.5 hours up to several days in the presence or absence of a solvent. It is preferred that the equilibration reaction be conducted in an inert atmosphere.

Generally, it is preferred that the equilibration be conducted in the absence of a solvent; however, when lithium containing catalysts are used, then it is preferred that the equilibration be conducted in the presence of "aprotic" solvents.

The term "aprotic solvent" is intended to mean any organic solvent which is free of active protons. These may include such solvents as various tertiary amines such as triethylamine, tributylamine, pyridine and the like. Other suitable solvents are dimethyl sulfoxides, dioxane, alkyl ethers; glycols such as diethylene glycol diethyl ether, diethylene glycol dimethyl ether, diethoxyethane, tetrahydrofuran and the like. These solvents are chosen such that their electron donating centers are capable of forming a coordination complex with the cation, thereby increasing its reactivity towards the diorganocyclosiloxane. Aprotic solvents which have Lewis base characteristics are preferably employed because of their ability to donate electrons to the cation, thereby coordinating with the cation and enhancing its reactivity by virtue of such coordination.

Certain other hydrocarbon aprotic systems which do not coordinate with the cation may be employed with the aprotic solvents described above to provide more intimate contact between the reactants. Examples of suitable hydrocarbon aprotic solvents are heptane, benzene, toluene, xylene and the like. It is preferred that from 0.05 to about 10 percent by weight of an aprotic solvent having a Lewis base characteristic be employed and the remainder of the solvent may be selected from the hydrocarbon aprotic solvents.

Other aminofunctional silicon fluids which may be used in the release composition are those obtained from the reaction of polyaminoalkyl alkoxysilanes of the formula $$R'''_a(E_hM) Si (OR''')_{3-a}$$

or the corresponding siloxanes with organosiloxanes of the general formula $$R_y Si (OH)_m O_{4-m-y/2}$$

wherein R is the same as above, R''' is a monovalent hydrocarbon radical having from 1 to 18 carbon atoms, M is an aliphatic hydrocarbon radical having from 1 to 10 carbon atoms and having a valence of $h+1$, where $h$ is a number of from 1 to 3, E is a monovalent radical attached to M by a carbon-nitrogen bond and is composed of carbon, nitrogen and hydrogen atoms and contains at least one amine group, $a$ is a number of from 0 to 2, $m$ has a positive average value up to and including 2, and $y$ is a number of from 0.5 to 2.49 and the sum of $m$ and $y$ has an average value up to and including 3.

These aminofunctional siloxane copolymers may be prepared by contacting the aminofunctional silanes or the corresponding siloxanes with the organosiloxane is a liquid phase in accordance with the procedure described in U.S. Pat. No. 3,355,424 to Brown. Generally, the reaction will proceed rather slowly at room temperature, however, the reaction rate may be accelerated by heating the reaction mixture at temperatures of from 50° to about 200° C.

Other aminofunctional silicon fluids which may be used are tertiary aminoorganosilanes or siloxanes which have at least one ether linkage in the organo group connecting the tertiary amino group to the silicon atoms. The tertiary aminoorganosiloxanes may be represented by the general formula

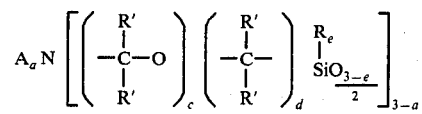

in which A is a monovalent hydrocarbon radical, a hydroxy terminated polyalkyleneoxy group, an alkenyloxy terminated polyalkyleneoxy group, a hydroxyalkyl group, a tertiary aminoalkyl group or a divalent group which, together with the nitrogen atom forms a heterocyclic ring, R is a monovalent hydrocarbon radical, R' is a monovalent hydrocarbon radical having from 1 to 18 carbon atoms or hydrogen, $a$ is a number of from 0 to 2, $c$ and $d$ are each numbers of from 1 to 10 and $e$ is a number of from 0 to 2.

These tertiary aminoorganosiloxanes may be prepared by a platinum catalyzed addition reaction of an alkenyl ether of a tertiary hydroxyalkyl amine and a hydrosilicon compound (i.e., a silane or siloxane containing silicon-bonded hydrogen) in accordance with the procedure described in U.S. Pat. No. 3,402,191 to Morehouse. Generally temperatures of from 100° C. to about 160° C. are preferred and solvents for the reactants (e.g., aromatic hydrocarbons such as toluene, and ethers such as ethylene glycol dimethyl ether) can be employed, particularly where the reactants are incompatible and/or it is desired to minimize cross-linking. It is preferred that the addition reaction be conducted under an atmosphere of an inert gas to minimize side reactions.

Other aminofunctional silicon fluids which may be used are those derived from the condensation and/or the partial hydrolysis and condensation of a liquid silanol chain-stopped polydiorganosiloxane having the formula

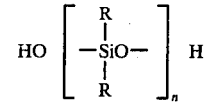

with various mole ratios of an aminoalkoxyalkylsilane or an aminoalkoxyalkenylsilane having the formula

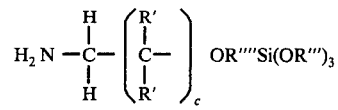

and, if desired, aminoalkylsilanes having the formulae

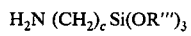

or

or from the condensation of the above liquid silanol chain-stopped polydiorganosiloxane with the above aminofunctional silanes in various mole ratios in which R, R', R''', $c$ and $n$ are the same as above and R'''' is a divalent alkylene radical having from 2 to 10 carbon atoms or a divalent alkenyl radical having from 3 to 8 carbon atoms and an olefinic bond on the carbon atom adjacent to the silicon atom. These aminofunctional organopolysiloxane copolymers may be prepared in accordance with the procedure described in U.S. Pat. No. 3,544,498 to Holdstock et al in which a mixture containing the silanol chain-terminated polyorganosiloxane and the aminoalkoxyalkylsilane or aminoalkyoxyalkenylsilane and, if desired, the aminoalkylsilane are partially hydrolyzed and condensed, or in accordance with the procedure described in U.S. Pat. No. 3,355,424 to Brown in which an aminofunctional silane and silanol chain-stopped polyorganosiloxanes are condensed.

The release agent of this invention can contain from 0.1 percent to 90 percent by weight of the aminofunctional silicon fluid and from 10 percent to 99.9 percent by weight of an organopolysiloxane. It is preferred that the composition contain from about 1.0 to about 30 percent by weight of the aminofunctional silicon fluid and from 70 percent to 99 percent by weight of the organopolysiloxane based on the weight of the aminofunctional silicon fluid and the organopolysiloxane. The character of the particular bituminous materials dictates the ratio of the organopolysiloxane fluid and aminofunctional silicon fluid used in the release composition.

Although it is not essential, the release agent of this invention may be diluted with organic solvents and then applied to the confining or shipping means by any conventional technique known in the art. The amount of aminofunctional silicon fluid and organopolysiloxane fluid employed in the release composition may range from 0.1 percent to 99 percent and more preferably a solution containing from 1.0 to 20 percent by weight based on the weight of the release agent may be employed. Examples of suitable organic solvents are aliphatic hydrocarbons such as hexane, heptane, octane; aromatic hydrocarbons such as benzene, toluene, xylene, ethylbenzene, naphtha; halogenated hydrocarbons such as methylene chloride, perchloroethylene, trichloroethylene, carbon tetrachloride; ethers and polyethers such as diethyl ether, dimethyl ether, dibutyl ether, diethylene glycol dimethyl ether, diethylene glycol diethyl ether and the like.

The release agents of this invention are especially effective for various bituminous materials such as asphalts, bitumen, tars and pitches. The term "bituminous materials" includes not only "asphalt" and "asphaltic compositions" but also include liquid or semi-liquid residues obtained from the destructive distillation of non-asphaltic petroleum, from the distillation of semi asphaltic and asphaltic petroleums, from the distillation of pressure tar, from the distillation of the residiums resulting from the thermal and catalytic cracking of petroleum and from the mixing of harder residual asphalts with heavy distillates. Generally these asphaltic compositions may be characterized as having a penetration value at 77° F. of from about 1 to about 300 mm/10 (ASTM D-5-59-T) and a softening point of from about 100° to about 344° F. (ASTM D-36-26).

These bituminous materials may also include aggregate materials such as rocks and stones which are mixed therewith and applied as hot or cold laid aggregate-asphalt mixes. These asphalt aggregates may be used in the construction of hard surfaces such as pavements, driveways and the like.

The release composition may be applied as a film to paper or metal confining means by any conventional method known in the art such as by brushing, spraying or dipping in a conventional coating device. The release agent may also be incorporated in the bituminous materials such as in the asphalt aggregates.

The release composition may be applied to cellulosic materials such as cellulosic sheet material, parchment paper, kraft paper, paperboard, cardboard, pulpboard and pasteboard. When a viscous composition is employed it is preferably applied as a solution in an organic solvent. Generally, the solvent is removed by passing the treated material over heated rolls maintained at temperatures of from 50° to 150° C. for from 2 to 30 minutes or more. The use of circulating hot air at temperatures of from 50° to 155° C. may also be used for times of from 15 seconds to 30 minutes to effect removal of the solvent. This drying step will impart optimum release properties to the coated material without further heat treatment.

Some of the advantages of this invention is that it provides repeated releases of bituminous materials which are brought into contact with a confining means such as a metal support. Moreover, when this release agent is applied to metal confining means such as are used in transporting bituminous paving materials, it does not cause soft spots in the resulting pavement. Since release agents containing silicone fluids do not provide repeated release of bituminous materials, it was quite surprising to discover that the incorporation of a minor proportion of aminofunctional silicon fluid with an organopolysiloxane fluid provided an excellent release coating which withstood repeated uses of the coated substrate in contact with bituminous materials. It was further found that this release composition was markedly superior to the silicone fluids or diesel fuel used heretofore in a number of applications which involved bituminous materials such as asphalt, tars and pitches.

Various embodiments of this invention are illustrated in the following examples in which all parts are by weight unless otherwise specified.

EXAMPLE 1

An aminofunctional silicon fluid is prepared by heating a mixture containing about 266.4 parts of octamethylcyclotetrasiloxane, 22.4 parts of beta-(aminoethyl)-gamma-aminopropyltrimethoxysilane and 0.29 part of potassium hydroxide to a temperature of 145° C. for three hours. After cooling the liquid product to room temperature 0.29 part of acetic acid is added to neutralize the catalyst. The product is filtered and a liquid product having a viscosity of about 40 cs. at 25° C. is recovered. Nuclear Magnetic Resonance (N.M.R.) analysis indicates that the ratio of beta-(aminoethyl)-gamma-aminopropyl to $OCH_3$ to $Me_2SiO$ groups is about 1:3:36.

About 6 parts of the aminofunctional silicon fluid prepared above is mixed with 94 parts of a trimethylsilyl end-blocked polydimethylsiloxane having a viscosity of 100,000 cs. at 25° C. and the mixture is sprayed onto the metal surface of a dump truck.

A bituminous composition containing 30.0 parts of stone, 59.5 parts of sand, 4.5 parts of dust and 6 parts of asphalt having a penetration at 77° F. of 90 mm/10 and a softening point of 120° F. is mixed in a hopper and emptied into the coated truck bed. The composition is easily removed at its site of use without any evidence of adhesion between the coated truck bed and the bituminous composition.

Good release properties are observed after hauling 30 loads of the bituminous composition without the application of additional release agent.

EXAMPLE 2

For purposes of comparison, a release agent containing 100 parts of trimethylsilyl end-blocked dimethylpolysiloxane fluid having a viscosity of 100,000 cs. at 25° C. are applied to the surface of a dump truck bed. The bituminous composition described in Example 1 is poured into the truck bed and transported to its site of use. Poor release properties are observed after only two loads.

EXAMPLE 3

The procedure of Example 1 is repeated except that the aminofunctional silicon fluid described in Example 1 is employed as the release agent. The bituminous composition adheres to the coated truck bed.

This example shows that the aminofunctional silicon fluid alone is a poor release agent for the bituminous composition.

EXAMPLE 4

(a) A release composition is prepared by mixing 2 parts of the aminofunctional silicon fluid of Example 1 with 98 parts of dimethylpolysiloxane having a viscosity of 60,000 cs. at 25° C.

To about 10 parts of the above composition are added about 90 parts of a naphtha solvent (flash point 25° C.) and applied to previously cleaned steel panels. The solvent is vaporized off by placing the coated panels in an air circulating oven at a temperature of about 160° C. for about 20 minutes. The panels are then coated with a sample of asphaltic material heated to about 150° C. After cooling to room temperature, the asphalt is stripped from the panel and the panel is then coated with additional asphaltic material. This process is repeated until the asphalt begins to adhere to the panel.

The number of releases that are obtained before the asphalt begins to adhere to the coated panel are shown in the following Table.

(b) A release composition is prepared in accordance with Example 4(a) except that the dimethylpolysiloxane has a viscosity of 10,000 cs. at 25° C.

The number of releases are determined in accordance with the procedure described above. The results are illustrated in the following Table.

(c) A release composition is prepared in accordance with Example 4(a) except that the dimethylpolysiloxane fluid has a viscosity of 1,000 cs. at 25° C.

The number of releases are determined in accordance with the procedure described in Example 4(a). The results are illustrated in the following Table.

(d) The process of Example 4(a) is repeated except that the release composition contains 1 part of a dimethylpolysiloxane having a viscosity of 60,000 cs. at 25° C., 9 parts of the aminofunctional silicon fluid prepared in accordance with Example 1 and 90 parts of naphtha solvent. The number of releases are shown in the following Table.

(e) A release composition is prepared by mixing 8 parts of a dimethylpolysiloxane gum having a plasticity value of from 95 to 100 millimeters with 48 parts of a naphtha solvent (flash point 25° C.) To the above mixture are added with agitation 41 parts of a dimethylpolysiloxane fluid having a viscosity of 60,000 cs. at 25° C. and about 1 part of a dimethylpolysiloxane fluid having a viscosity of 350 cs. at 25° C. About 2 parts of the aminofunctional silicon fluid prepared in accordance with the procedure described in Example 1 are added to the above composition.

A composition containing about 10 parts of the above composition and 90 parts of a naphtha solvent (flash point 25° C.) is applied to previously cleaned steel panels. The solvent is vaporized off by placing the coated panels in an air circulating oven at a temperature of about 160° C. for about 20 minutes. The panels are then coated with a sample of asphaltic material heated to about 150° C. after cooling to room temperature, the asphalt is stripped from the coated panel and the panel is again coated with additional asphaltic material. The process is repeated until the asphaltic material begins to adhere to the panel surface. The number of releases are shown in the following Table.

(f) The process of Example 4(a) is repeated except that dimethylpolysiloxane fluid is omitted from the release composition and 10 parts of the aminofunctional silicon fluid prepared in Example 1 is mixed with 90 parts of naphtha solvent and applied to previously cleaned steel panels. The number of releases are shown in the following Table.

(g) The process of Example 4(a) is repeated except that the release composition contains 10 parts of dimethylpolysiloxane having a viscosity of 60,000 cs. at 25° C. and 90 parts of naphtha solvent. The number of releases are shown in the following Table.

TABLE

| Example No. | Solvent, parts | Aminofunctional silicon fluid, parts | Dimethylpolysiloxane fluid, parts-viscosity | | Dimethylpolysiloxane gum, parts | Releases |
|---|---|---|---|---|---|---|
| 4(a) | 90.0 | 0.2 | 9.8 | 60,000 | — | 27 |
| (b) | 90.0 | 0.2 | 9.8 | 10,000 | — | 20 |
| (c) | 90.0 | 0.2 | 9.8 | 1,000 | — | 18 |
| (d) | 90.0 | 9.0 | 1.0 | 60,000 | — | 25 |
| (e) | 95.6 | 0.2 | 4.1 | 60,000 | 0.8 | 30 |
| (f) | 90.0 | 10.0 | 0.1 | 350 | — | 12 |
| (g) | 90.0 | — | 10.0 | 60,000 | — | 3 |

EXAMPLE 5

The procedure of Example 1 is repeated except that the aminofunctional silicon is prepared by reacting 9 parts of beta-(aminoethoxy)propyltrimethoxysilane, 316 parts of hexamethylcyclotrisiloxane and 0.3 part of n-butyllithium at a temperature of about 125° C. The resultant product which is neutralized with 0.3 part of acetic acid has a viscosity of about 125 cs. at 25° C. The ratio of beta-(aminoethoxy)propyl groups to $OCH_3$ groups to $Me_2SiO$ groups is about 1:3.1:98.

When the above composition is mixed with a trimethylsilyoxy end-blocked dimethylpolysiloxane having a viscosity of 60,000 cs. at 25° C. and applied to a dump truck bed, more than 20 releases are obtained for each application of the release composition.

EXAMPLE 6

An aminofunctional silicon fluid is prepared by heating 129 parts of a hydrosiloxane having the average formula $(CH_3)_3 SiO[(CH_3)_2 SiO]_{8.5}[(CH_3HSiO)]_{3.5} Si(CH_3)_3$ with 25 parts of platinum per million parts by weight of the reactants as chloroplatinic acid. About 71 parts of the allyl ether of N,N-dimethylethanolamine having the formula $(CH_3)_2 NCH_2 CH_2 OCH_2 CH=CH_2$ is added dropwise while maintaining the reaction mixture at a temperature between about 150 and 158° C. The total time of addition is about 8 minutes. The reaction mixture is heated at 150° C. for an additional 3 hours, then sparged at this temperature for 40 minutes with nitrogen. The resulting product is amber in color and has a viscosity of about 90 cs. at 25° C.

The aminofunctional silicon fluid prepared above is substituted for the aminofunctional silicon fluid in the formulation of Example 4(a) and the number of releases were determined in accordance with this Example. The asphaltic material began to adhere to the coated panel after 24 releases.

EXAMPLE 7

An aminofunctional silicon fluid is prepared by mixing 30 parts of a silanol chain-stopped polydimethylsiloxane of the formula $$HO\left[\begin{array}{c} CH_3 \\ | \\ -SiO- \\ | \\ CH_3 \end{array}\right]_5 H$$

with 7.5 parts of 3-(3-aminopropoxy)propyltrimethoxysilane and about 12 parts of gamma-aminopropyltrimethoxysilane. The reaction mixture is thoroughly agitated and then 0.35 part of water is added with agitation. The resulting organopolysiloxane copolymer has a viscosity of about 150 cs. at 25° C.

When the aminofunctional silicon fluid prepared above is substituted for the aminofunctional silicon fluid in the formulation of Example 6, the formulation provided up to 27 releases before the asphaltic material began to adhere to the coated panel.

EXAMPLE 8

An aminofunctional silicon fluid is prepared by heating a mixture containing about 150 parts of a (polyaminoalkyl) alkoxysilane having the formula $(CH_3O)_3 Si(CH_2)_3 NHCH_2 CH_2 NH_2$ with about 50 parts of a polymer having the formula
$HO(CH_3)_2 SiO[(CH_3)_2 SiO]_a Si(CH_3)_2 OH$ where the average value of $a$ is such that the polymer contains about 3.5 percent OH groups to a temperature of about 150° C. under reflex conditions, cooled and then about 17.2 parts of water and about 150 parts of ethanol are added. About one third of the ethanol is removed by distillation. About 75 weight percent of the units of the resulting copolymer have the formula $NH_2 CH_2 CH_2 NH(CH_2)_3 Si(OCH_3)_x O_{3-z/2}$ and about 25 weight percent of the units are $(CH_3)_2 SiO$. Theoretically the value of $z$ is in the range of between 0 and 1.

When the aminofunctional silicon fluid prepared above is substituted for the aminofunctional silicon fluid in the formulation of Example 6, the formulation provided up to 28 releases before the asphaltic material began to adhere to the coated panel.

EXAMPLE 9

An aminofunctional silicone fluid is prepared by mixing 750 grams of a silanol chain-stopped dimethylpolysiloxane, containing 3.05 percent (OH) groups, with 250 grams of beta-aminoethylgamma-aminopropyltrimethoxysilane. The mixture is heated for 2.0 hours at 145° C. and the methanol formed from the condensation reaction is distilled off.

When the aminofunctional silicon fluid prepared above is substituted for the aminofunctional silicon fluid in the formulation of Example 6, the formulation provided up to 22 releases before the asphaltic material began to adhere to the coated panel.

Although specific examples of the invention have been described herein, it is not intended to limit the invention solely thereto, but to include all the variations and modifications falling within the spirit and scope of the appended claims.

What is claimed is:

1. A method for imparting release properties to a substrate which is in contact with bituminous materials which comprises (1) coating the substrate with a composition containing (a) an organopolysiloxane fluid of the general formula $(R_2SiO)_n$ which is substantially free of hydroxyl groups and has a viscosity of from 5 to 1,000,000 cs. at 25° C. in which R represents a monovalent hydrocarbon radical having from 1 to 18 carbon atoms and $n$ is a number greater than 20 and (b) from 0.1 to 90 percent by weight of an aminofunctional silicon fluid based on the total weight of the organopolysiloxane fluid and the aminofunctional silicon fluid and thereafter contacting said coated substrate with the bituminous materials.

2. The method of claim 1 wherein the aminofunctional silicon fluid is obtained from the equilibration of an organopolysiloxane and an aminofunctional silane or siloxane in the presence of a base catalyst.

3. The method of claim 2 wherein the organopolysiloxane used in the preparation of the aminofunctional silicon fluid is represented by the formula $$\left[\begin{array}{c} R \\ | \\ -SiO- \\ | \\ R \end{array}\right]_w$$

in which R is a monovalent hydrocarbon radical having from 1 to 18 carbon atoms and $w$ is a number of from 3 to 10.

4. The method of claim 2 wherein the organopolysiloxane used in the preparation of the aminofunctional silicon compound is represented by the formula

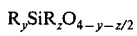

in which R is a monovalent hydrocarbon radical. y is a number of from about 0.5 to 3.0, z is a number of from 0.001 to 1 and the sum of y and z is a number of from 1 to 3.0.

5. The method of claim 2 wherein the aminofunctional silane or siloxane is represented by the formula

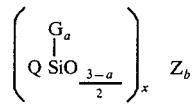

in which G is selected from the group consisting of R, OR', OSiR$_3$ and OR'' NR$_2$ in which R is a monovalent hydrocarbon radical having from 1 to 18 carbon atoms, R' is selected from the group consisting of hydrogen and monovalent hydrocarbon radicals having from 1 to 18 carbon atoms, R'' is selected from the group consisting of substituted and unsubstituted divalent hydrocarbon radicals, substituted and unsubstituted divalent hydrocarbonoxy radicals in which the oxygen is in the form of an ether linkage and unsaturated divalent substituted and unsubstituted hydrocarbon radicals, Q is selected from the group consisting of R'$_2$NR''-, $$R'_2NR'' \overset{R'}{\underset{|}{N}} R''-, \text{ and}$$
$$R'_2NR''OR''$$

Z is selected from the class consisting of R'O$_{0.5}$, R$_3$SiO$_{0.5}$ and R'NR''O$_{0.5}$, a is a number of from 0 to 2, b is a number of from 0 to 3 and x is a number of from 1 to 20,000.

6. The method of claim 1 wherein the aminofunctional silicon fluid is obtained from the reaction of beta-aminoethylgamma-aminopropyltrimethoxysilane and a silanol chain-stopped dimethylpolysiloxane.

7. The method of claim 1 wherein the aminofunctional silicon compound is present in an amount of from 1.0 to 30 percent by weight based on the total weight of the aminofunctional silicon fluid and the organopolysiloxane.

8. The method of claim 1 wherein the organopolysiloxane fluid is polydimethylsiloxane.

9. The method of claim 1 wherein the composition containing the organopolysiloxane fluid and aminofunctional silicon fluid is diluted with an organic solvent.

10. The method of claim 1 wherein the aminofunctional silicon fluid is obtained from the reaction of (polyaminoalkyl) alkoxysilanes of the formula $$R''_a (E_hM) Si (OR''')_{3-a}$$

or siloxanes thereof with organopolysiloxanes of the formula $$R_y Si (OH)_m O_{4-m-y/2}$$

in which R is a monovalent hydrocarbon radical having from 1 to 18 carbon atoms, R''' is a monovalent hydrocarbon radical having from 1 to 18 carbon atoms, M is an aliphatic hydrocarbon radical having from 1 to 10 carbon atoms and having a valence of h+1, h is a number of from 1 to 3, E is a monovalent radical attached to M by a carbon-nitrogen bond and is composed of carbon, nitrogen and hydrogen atoms and contains at least one amine group, a is a number of from 0 to 2, m has a positive average value up to and including 2 and y is a number of from 0.5 to 2.49 and the sum of m and y is an average value up to and including 3.

11. The method of claim 1 wherein the aminofunctional silicon fluid is obtained from the hydrolysis and condensation of a liquid polydiorganopolysiloxane having the formula

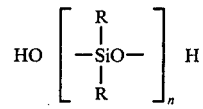

and a silane selected from the group consisting of an aminoalkoxyalkylsilane and an aminoalkoxyalkenylsilane of the formula

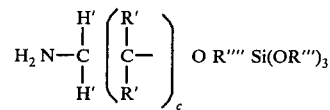

in which R is a monovalent hydrocarbon radical having from 1 to 18 carbon atoms, R' is selected from the group consisting of hydrogen and monovalent hydrocarbon radicals having from 1 to 18 carbon atoms, R'''' is selected from the group consisting of divalent alkylene radicals having from 2 to 10 carbon atoms and divalent alkenyl radicals having from 3 to 10 carbon atoms and an olefinic bond on the carbon atoms adjacent to the silicon atom, c is a number of from 1 to 10 and n is a number greater than 20.

12. The method of claim 11 which includes an aminoalkylsilane of the formula $$H_2N (CH_2)_c Si (OR''')_3$$

in which R''' is a monovalent hydrocarbon radical having from 1 to 18 carbon atoms and c is a number of from 1 to 10.

13. The method of claim 11 which includes beta-(aminoethyl)gamma-aminopropyl trimethyloxysilane.

14. The method of claim 1 wherein the aminofunctional silicon fluid is a tertiary aminoorganosiloxane of the general formula

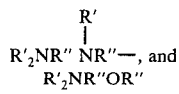

in which A is selected from the group consisting of monovalent hydrocarbon radicals having from 1 to 18 carbon atoms, hydroxy terminated polyalkyleneoxy groups, alkenyloxy terminated polyalkyleneoxy groups, hydroxyalkyl groups, tertiary aminoalkyl groups and divalent groups in which together with the nitrogen atom forms a heterocyclic ring containing only carbon and nitrogen, with hydrogen as the only substituent on the ring or only carbon, nitrogen and oxygen with hydrogen as the only substituent on the ring, R is a monovalent hydrocarbon radical having from 1 to 18 carbon atoms, R' is selected from the group consisting of hydrogen and monovalent hydrocarbon radicals having from 1 to 18 carbon atoms, *a* is a number of from 0 to 2, *c* and *d* are each numbers of from 1 to 10 and *e* is a number of from 0 to 2, said tertiary aminoorganosiloxane is obtained from the platinum catalyzed addition reaction of an alkenyl ether of a tertiary hydroxyalkylamine and a silicon compound selected from the group consisting of silanes and siloxanes containing silicon bonded hydrogen.

15. The method of claim 1 wherein the substrate is a cellulosic material.

16. A method for imparting release properties to a substrate that is in contact with bituminous materials which comprises (1) coating the substrate with a composition containing (a) an organopolysiloxane fluid of the general formula $$(R_2SiO)_n$$

in which R represents a monovalent hydrocarbon radical having from 1 to 18 carbon atoms, *n* is a number greater than 20, (b) an aminofunctional silicon fluid and (c) an organic solvent in an amount of from 1 to 99.9 percent based on the total weight of the release composition, (2) drying the coating and thereafter (3) contacting said coated substrate with the bituminous material.

17. The method of claim 16 wherein the substrate is a cellulosic material.

* * * * *